(12) United States Patent
Zhang et al.

(10) Patent No.: US 11,859,546 B2
(45) Date of Patent: Jan. 2, 2024

(54) ECCENTRIC GUTTER FOR AN EPICYCLICAL GEAR TRAIN

(71) Applicants: General Electric Company, Schenectady, NY (US); GE Avio S.r.I., Rivalta di Torino (IT)

(72) Inventors: Xiaohua Zhang, Glenville, NY (US); Bugra H. Ertas, Niskayuna, NY (US); Walter J. Smith, Ballston Spa, NY (US); Flavia Turi, Turin (IT)

(73) Assignees: GENERAL ELECTRIC COMPANY, Schenectady, NY (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/657,685

(22) Filed: Apr. 1, 2022

(65) Prior Publication Data
US 2023/0313738 A1    Oct. 5, 2023

(51) Int. Cl.
*F16H 57/04* (2010.01)
*F02C 7/06* (2006.01)
*F02C 7/36* (2006.01)

(52) U.S. Cl.
CPC ............... *F02C 7/06* (2013.01); *F02C 7/36* (2013.01); *F05D 2260/40311* (2013.01); *F05D 2260/98* (2013.01); *F16H 57/0423* (2013.01); *F16H 57/0456* (2013.01); *F16H 57/0479* (2013.01)

(58) Field of Classification Search
CPC ............. F16H 57/0423; F16H 57/0456; F16H 57/0479; F16H 57/0482; F01D 25/18; F16N 31/02
See application file for complete search history.

(56) References Cited

U.S. PATENT DOCUMENTS

| | | | |
|---|---|---|---|
| 6,877,950 B2 | 4/2005 | Liu | |
| 8,201,663 B2* | 6/2012 | Munson | ............... F01D 25/183 384/473 |
| 9,726,040 B2 | 8/2017 | Gekht et al. | |
| 10,208,624 B2 | 2/2019 | Duong et al. | |
| 11,008,942 B2 | 5/2021 | Jacquemard et al. | |
| 11,060,417 B2 | 7/2021 | McCune | |
| 11,066,945 B2 | 7/2021 | McCune | |
| 11,162,421 B2 | 11/2021 | Dick et al. | |
| 2006/0054408 A1* | 3/2006 | Swainson | ........... F16H 57/0421 184/6.12 |
| 2010/0058729 A1* | 3/2010 | Fomison | ................. F01D 25/18 60/39.08 |

(Continued)

FOREIGN PATENT DOCUMENTS

| | | |
|---|---|---|
| EP | 3896262 A1 | 10/2021 |
| FR | 2999643 B1 | 1/2015 |

(Continued)

*Primary Examiner* — Minh Truong
(74) *Attorney, Agent, or Firm* — Venable LLP; David D. Leege; Michele V. Frank

(57) ABSTRACT

A gearbox for a gas turbine engine. The gearbox including a rotor and a gutter. The oil system is configured to supply oil to the gearbox. The rotor is rotatable about a rotation axis. The rotor expels oil radially outward when the rotor rotates. The gutter is positioned radially outward of the rotor to collect oil expelled by the rotor when the rotor rotates. The gutter is positioned eccentrically with respect to the rotor.

20 Claims, 6 Drawing Sheets

(56) References Cited

U.S. PATENT DOCUMENTS

| | | | |
|---|---|---|---|
| 2014/0064930 A1* | 3/2014 | NguyenLoc | F16H 57/045 415/122.1 |
| 2015/0300255 A1* | 10/2015 | Gallet | F16H 57/0427 475/159 |
| 2017/0130605 A1* | 5/2017 | Gerstler | F16H 57/0417 |
| 2019/0093527 A1* | 3/2019 | Sheridan | F01D 25/18 |
| 2019/0226575 A1* | 7/2019 | Kurz-Hardjosoekatmo | B60K 6/365 |
| 2019/0376595 A1* | 12/2019 | Meyer | F16H 57/0427 |
| 2021/0262397 A1* | 8/2021 | Di Giovanni | F16H 57/046 |
| 2022/0316584 A1* | 10/2022 | Jacquemard | F01D 15/12 |

FOREIGN PATENT DOCUMENTS

| | | |
|---|---|---|
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |

\* cited by examiner

US 11,859,546 B2

ECCENTRIC GUTTER FOR AN EPICYCLICAL GEAR TRAIN

TECHNICAL FIELD

The present disclosure relates to an oil gutter for an epicyclical gear train, and particularly, for an epicyclical gear train used in gas turbine engines for aircraft.

BACKGROUND

Oil is used in a power gearbox, such as a power gearbox including an epicyclical gear train, to lubricate gears and bearings in the gearbox. In an epicyclical gear train, oil may be supplied to lubricate the mesh between the gears. As the gears of the epicyclical gear train rotate during operation, the oil is expelled outwardly by inertial (or centrifugal) forces. The oil may be collected by a gutter located radially outward of the gears.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As noted above, oil used to lubricate the gears of an epicyclical gear train may be expelled radially outward and collected by a gutter. The gutter may be circular and circumscribes the gears of the epicyclical gear train, such that the gutter is located radially outward of the gears. The oil collected by the gutter may be removed at a scavenge port. The amount of oil in the gutter varies based on the circumferential position. Relative to the direction of rotation of a rotor of the epicyclical gear train, such as a planetary gear unit, the amount of oil in the gutter is the least just after the scavenge port and then increases, in the direction of rotation of the rotor, to the scavenge port. This build-up of oil in the gutter can result in windage losses for the rotor and oil churn. The gutter may be sized based on the volume of the largest amount of oil to avoid such losses and churn. Sizing based on this criterion can increase the size of the gutter and the overall size of the gearbox, and leaves excess distance between the rotor and the gutter at positions of the gutter where the amount of oil is less. Instead of positioning the gutter concentrically with the epicyclical gear train, in the embodiments discussed herein, the center of the gutter is located eccentrically with the center of rotation of the epicyclical gear train. In these embodiments, the surface level of the oil in the gutter is more uniformly spaced from the rotor over the entire circumference of the gutter. Keeping the oil and the rotor distance uniform maintains a minimum distance to avoid oil churning and windage losses, but saves space and reduces the overall size of the gearbox by eliminating excess space where large distances between the surface level of the oil and rotor is not necessary but would occur in concentric gutter designs.

Figure 1:
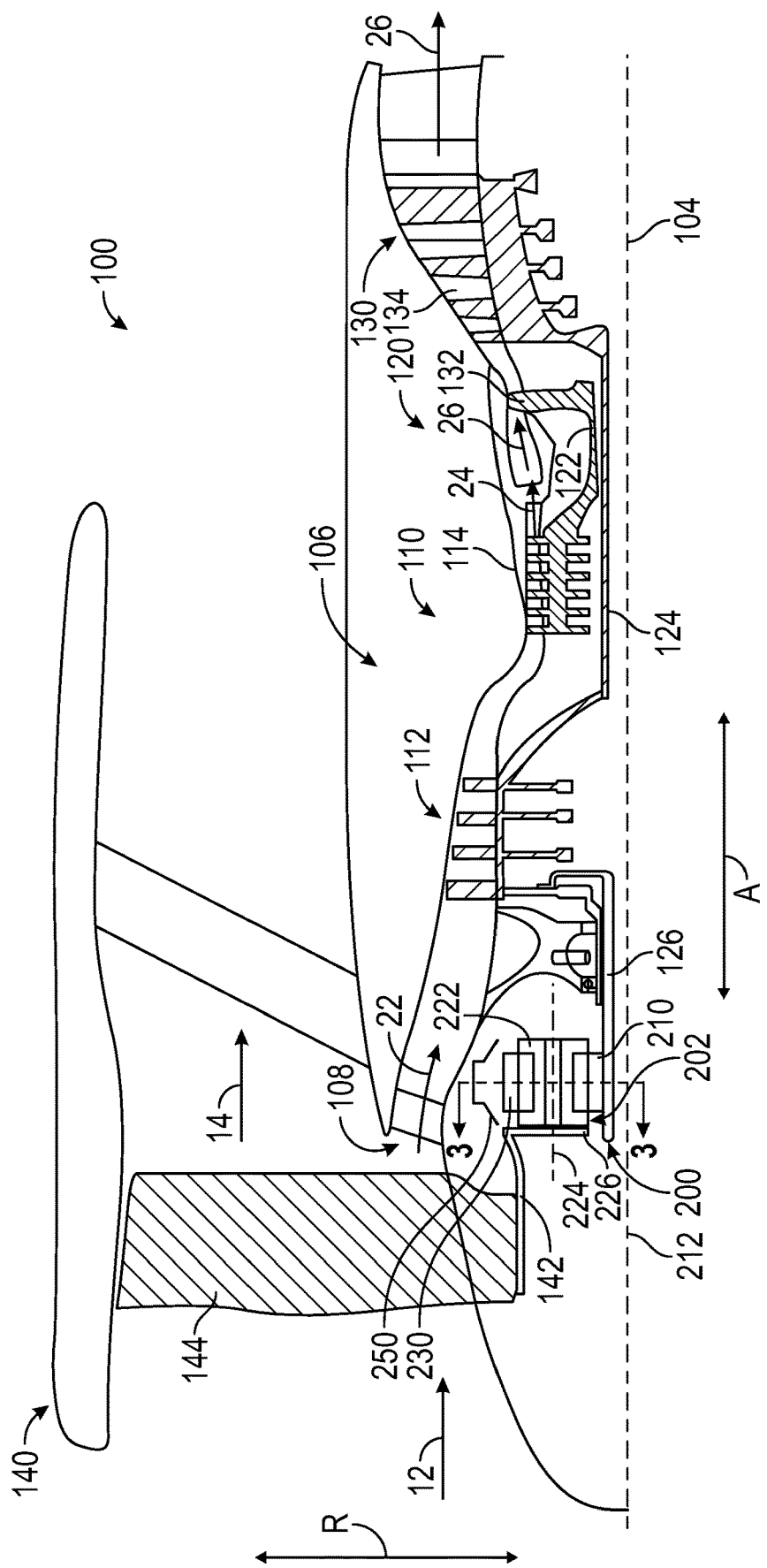
FIG. 1 is a cross-sectional view of a turbofan engine that uses a gearbox according to an embodiment of the present disclosure.
Figure 2:
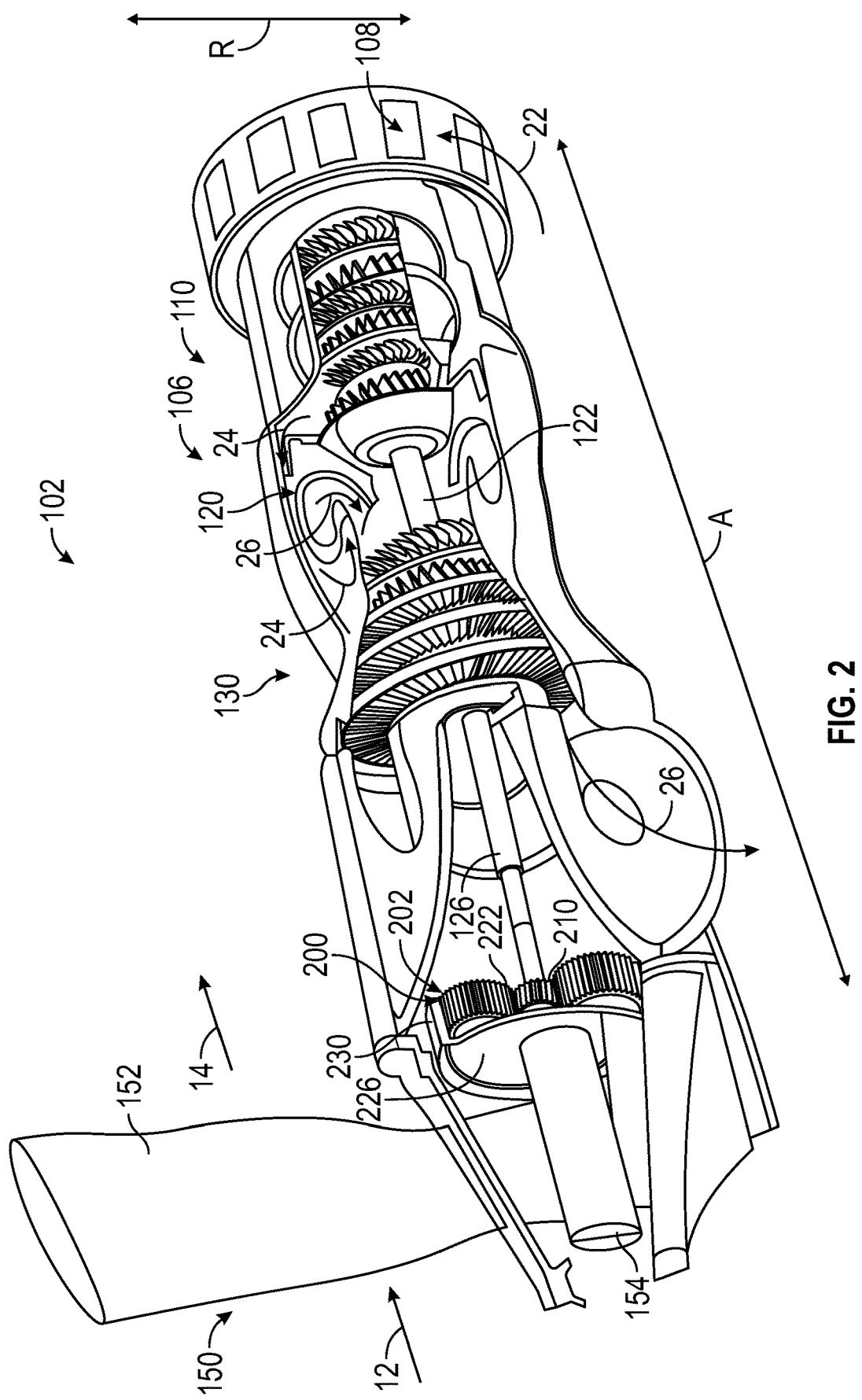
FIG. 2 illustrates a turboprop engine that uses a gearbox according to an embodiment of the present disclosure.

The gutter designs discussed herein are suitable for use in gearboxes used in the engines of aircraft and, in particular, gas turbine engines. FIGS. 1 and 2 illustrate two gas turbine engines that may be used for propulsion of an aircraft. The gas turbine engine shown in FIG. 1 is a high bypass turbofan engine 100. The gas turbine engine shown in FIG. 2 is a turboprop engine 102. Both of the turbofan engine 100 and the turboprop engine 102 include a gearbox 200 having an eccentric gutter 250 according to the present disclosure, as will be discussed further below. Although the description below refers to the turbofan engine 100 and/or the turboprop engine 102, the present disclosure is also applicable to wind turbines and turbo-machinery, in general, including, e.g., propfan gas turbine engines, turbojet gas turbine engines, and turboshaft gas turbine engines, including marine turbine engines, industrial turbine engines, and auxiliary power units. Moreover, the eccentric gutter arrangement may be used in any suitable gearbox including those having an epicyclical gear train.

As shown in FIG. 1, the turbofan engine 100 has an axial direction A (extending parallel to a longitudinal centerline 104), a radial direction R, and a circumferential direction. The circumferential direction (not depicted in FIG. 1) extends in a direction rotating about the longitudinal centerline 104. The turbofan engine 100 may include an engine core 106 (also referred to as a turbomachine) and a fan assembly 140. The engine core 106 may generally include, in serial flow arrangement, a compressor section 110, a combustion section 120, and a turbine section 130. The compressor section 110 may define one or more compressors, such as, for example, a low-pressure compressor 112 and a high-pressure compressor 114. The turbine section 130 may define one or more turbines, such as, e.g., a high-pressure turbine 132 and a low-pressure turbine 134. In various embodiments, the compressor section 110 may further include an intermediate pressure compressor. In still other embodiments, the turbine section 130 may further include an intermediate pressure turbine. In wind turbine applications, the engine core 106 may generally be defined as one or more generators.

The low-pressure compressor 112 and the high-pressure compressor 114 in the compressor section 110 and the high-pressure turbine 132, and the low-pressure turbine 134 in the turbine section 130, may each include one or more rotors. In one embodiment, the rotors include one or more shafts of the turbofan engine 100 connecting the compressor section 110 to the turbine section 130. In other embodiments, the rotors generally define a disk extended at least partially in the radial direction R and a plurality of airfoils connected in a circumferentially adjacent arrangement and extended outward in the radial direction R from the disk. In one embodiment, the one or more rotors may each be connected together. For example, each rotor of the turbine section 130 or the compressor section 110 may be connected by mechanical fasteners, such as, e.g., bolts, nuts, screws, and/or rivets, or by a bonding process, such as, e.g., welding, friction bonding, diffusion bonding, etc. In various embodiments, one or more compressors of the compressor section 110 may be drivingly connected and rotatable with one or more turbines of the turbine section 130 by way of the one or more shafts. For example, the rotors of the low-pressure compressor 112 may be connected to and driven by the rotors of the low-pressure turbine 134, by a low-pressure shaft 122, and the rotors of the high-pressure compressor 114 may be connected to and driven by the rotors of the high-pressure turbine 132, by a high-pressure shaft 124.

The fan assembly 140 generally includes a fan rotor 142. The fan rotor 142 includes a plurality of blades 144 that are coupled to and extend outwardly from the fan rotor 142 in the radial direction R. In the embodiment shown in FIG. 1, the fan rotor 142 may extend in the axial direction A toward a forward end from a reduction gearbox or a power gearbox 200 (herein referred to as "gearbox 200"). The fan assembly 140 further includes a coupling shaft 126 coupled to the gearbox 200 and extended toward an aft end of the turbofan engine 100. The coupling shaft 126 may couple the engine core 106 to the gearbox 200.

Figure 3:
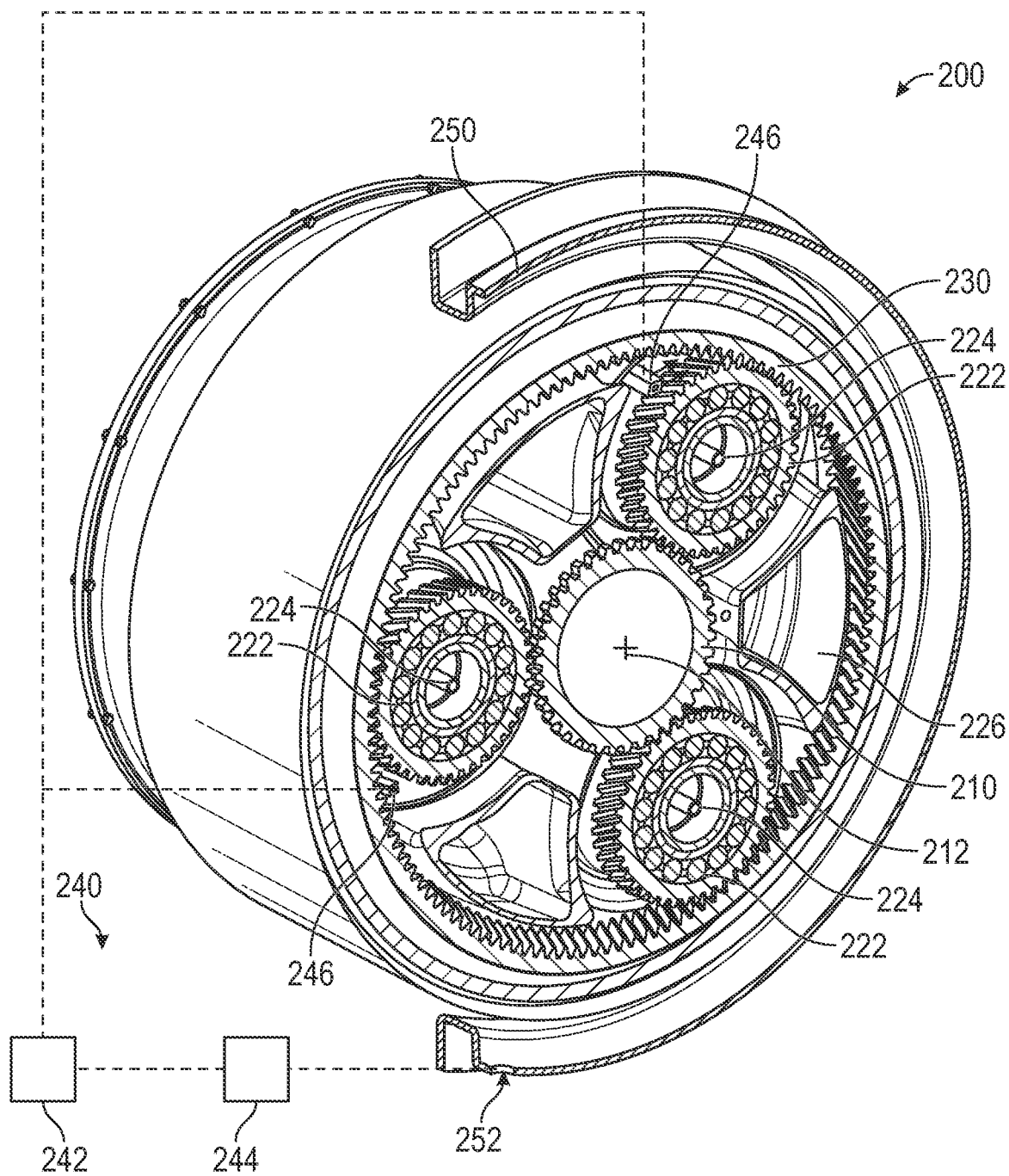
FIG. 3 is a perspective, cross-sectional view of the gearbox shown in FIG. 1, taken along line 3-3 in FIG. 1.

As shown in FIGS. 1 to 3, the gearbox 200 of this embodiment includes an epicyclical gear train 202 including a sun gear 210 and a plurality of planet gears 222. The sun gear 210 is axially installed onto and concentric to the coupling shaft 126, such that the sun gear 210 is attached to, or integral to, the coupling shaft 126. As will be discussed further below, the sun gear 210 is driven by the engine core 106 (receives a torque from the engine core 106) to rotate about a rotational axis 212, which, in this embodiment, is coincident with the longitudinal centerline 104. The sun gear 210 includes a plurality of teeth that engage (or mesh with) a plurality of teeth formed on each of the plurality of planet gears 222. A ring gear 230 (or annular gear) engages with the plurality of planet gears 222 and surrounds the plurality of planet gears 222. More specifically, the ring gear 230 includes a plurality of teeth that engage (or mesh with) a plurality of teeth formed on each of the plurality of planet gears 222.

In this embodiment, the ring gear 230 is stationary. The plurality of planet gears 222 rotate, not only about a rotation axis 224 for each planet gear 222, but the plurality of planet gears 222 also collectively rotate about the rotational axis 212 of the sun gear 210. The planet gears 222 are rotatably connected to a carrier 226, and the carrier 226 rotates about the rotational axis 212 of the sun gear 210 as the plurality of planet gears 222 collectively rotate. The plurality of planet gears 222 may be rotatably connected to the carrier 226 by various bearings (e.g., rollers, balls, or other bearing types, e.g., a journal bearing). The carrier 226 further connects to an output element to allow for rotation and transfer of power and torque from the sun gear 210 through the plurality of planet gears 222. For example, the carrier 226, may be coupled to or otherwise integral with the fan rotor 142. Each planet gear 222 of the plurality of planet gears 222 engages with the sun gear 210 to be rotated by the sun gear 210. Each planet gear 222 is configured to receive power and torque from the sun gear 210.

In other embodiments, the plurality of planet gears 222 may each be fixed such that the rotation axis 224 of each planet gear 222 is fixed relative to the sun gear 210. In such an arrangement, the ring gear 230 rotates about the rotational axis 212 of the sun gear 210, and the ring gear 230 connects to the output element, such as the fan rotor 142, to allow for rotation and transfer of power and torque from the sun gear 210 through the plurality of planet gears 222. The ring gear 230 engaging with each planet gear 222 of the plurality of planet gears 222 to be rotated by the plurality of planet gears 222. The ring gear 230 is configured to receive power and torque from the plurality of planet gears 222. In various embodiments, the gearbox 200 may further include additional planet gears disposed radially between the plurality of planet gears 222 and the sun gear 210, or between the plurality of planet gears 222 and the ring gear 230. The various gears may be various suitable gear designs, such as helical gears and, in the case of the planet gears 222, may include step gears.

As shown in FIG. 1, the coupling shaft 126 is connected to the engine core 106 to transmit torque and power from the engine core 106 to the sun gear 210, and through the epicyclical gear train 202 to the fan rotor 142. The fan rotor 142 may be connected to the carrier 226 or the ring gear 230 to receive torque from the sun gear 210, and to transfer torque to drive the fan assembly 140. As power and torque are transmitted from the engine core 106, the gearbox 200 provides power and torque at an output speed to the fan rotor 142 that is more suitably adjusted for the fan assembly 140. For example, the gearbox 200 may reduce fan rotor 142 speed relative to the engine core 106 by a factor of two or more. According to one embodiment, the gearbox 200 reduces the rotational speed from the engine core 106 (e.g., the compressor section 110 or the turbine section 130) and provides a desired amount of torque and rotational speed to the fan assembly 140.

During operation of the turbofan engine 100, a volume of air (inlet air 12), as indicated schematically by arrow 12, enters the turbofan engine 100. As the inlet air 12 passes across the fan blades 144, a portion of the air (bypass air 14), as indicated schematically by arrow 14, is directed or routed outside of the engine core 106 to provide propulsion. Additionally, another portion of air, as indicated schematically by arrow 22 and referred to as core air 22, is directed or routed through an associated inlet 108 into the compressor section 110. The core air 22 is progressively compressed as it flows through the compressor section 110, such as through the low-pressure compressor 112 and the high-pressure compressor 114, toward the combustion section 120. The now compressed air 24 (as indicated schematically by arrows 24) flows into the combustion section 120 where a fuel is introduced, mixed with at least a portion of the compressed air 24, and ignited to form combustion gases 26. The combustion gases 26 flow into the turbine section 130, causing rotary members of the turbine section 130 to rotate, and to support operation of respectively coupled rotary members in the compressor section 110 and/or the fan assembly 140, as discussed above.

As noted above, FIG. 2 shows a turboprop engine 102 that may be equipped with the gearbox 200 having the eccentric gutter arrangement. The discussion of the turbofan engine 100 shown in FIG. 1 also applies to the turboprop engine 102 shown in FIG. 2. The same reference numerals are used for the same or similar components between the turbofan engine 100 and the turboprop engine 102, and a detailed description of these components is omitted. In the arrangement, shown in FIG. 2, the inlet 108 is located on the aft end of the turboprop engine 102, and the core air 22 flows in a forward direction, but other arrangements of turboprop engine 102 may be used where the inlet 108 is located on the forward end of the turboprop engine 102. Instead of a fan assembly 140, the turboprop engine 102 includes a propeller assembly 150. The propeller assembly 150 includes a plurality of propeller blades 152 that are coupled to and extend outwardly from a propeller shaft 154 in the radial direction R. As with the fan rotor 142, the propeller shaft 154 is connected to the gearbox 200 to receive torque and power from the engine core 106 through the epicyclical gear train 202. The propeller shaft 154 may be connected to the epicyclical gear train 202 in a similar manner to the fan rotor 142 as discussed above.

FIG. 3 is a cross-sectional view of the gearbox 200 according to an embodiment. The cross-sectional view of FIG. 3 is taken along line 3-3 shown in FIG. 1. As discussed above, the gearbox 200 includes an epicyclical gear train 202 having a sun gear 210, a plurality of planet gears 222 rotatably connected to a carrier 226, and a ring gear 230. Oil may be used to lubricate the rotating parts of the gearbox 200, including the sun gear 210, the planet gears 222, and the ring gear 230. An oil system 240 is configured to supply oil to the gearbox 200. In this embodiment, the oil system 240 includes an oil pump 242 that draws oil from a reservoir 244 (or sump). The oil pump 242 pressurizes and drives the flow of oil to be injected by at least one oil nozzle 246. Oil may be injected downstream (in the rotation direction) of a nip formed between meshing (engaging) gears. As shown in FIG. 3, for example, the oil nozzle 246 is fluidly connected to the reservoir 244 and configured to inject oil in a nip formed between one of the planet gears 222 and the ring gear 230. Only one oil nozzle 246 is shown in FIG. 3, but a plurality of oil nozzles 246 may be used, such as, for example, at each of the nips formed between the planet gears 222 and the ring gear 230. The nozzle 246 is preferably located upstream of the nip and injects oil in a direction toward the nip. Oil may be supplied to the epicyclical gear train 202 using other suitable supply devices and at other locations, including, for example, nips formed between the planet gears 222 and the sun gear 210.

As noted above, the plurality of planet gears 222, together with the carrier 226, collectively rotate about the rotational axis 212 of the sun gear 210. The plurality of planet gears 222, together with the carrier 226, may be referred to as a rotor 220 herein. The ring gear 230 may be another example of a rotor in, for example, a configuration where the ring gear 230 rotates about the rotational axis 212 of the sun gear 210 instead of the plurality of planet gears 222. As the rotor 220 rotates about the rotational axis 212 of the sun gear 210, the oil is expelled outwardly by inertial (or centrifugal) forces and collected by a gutter 250.

The gutter 250 may be circular and circumscribes the gears of the epicyclical gear train 202, such that the gutter 250 is located radially outward of the rotor 220 and, more specifically, the plurality of planet gears 222 and the carrier 226. The gutter 250 is also located radially outward of the sun gear 210. The gutter 250 is shown radially outward of the ring gear 230, but, in some embodiments, particularly when the ring gear 230 is stationary, the gutter 250 may be formed integrally with the ring gear 230. The gutter 250 is shown as having a U-shape in this embodiment, but the gutter 250 may have any shape suitable for collecting the oil therein. The gutter 250 includes a scavenge port 252. The oil collected in the gutter 250 may be removed at the scavenge port 252. The scavenge port 252 is located on a bottom portion of the gutter 250 so that gravity may assist in the flow of oil to the scavenge port 252. The scavenge port 252 is fluidly connected to the reservoir 244, and the oil is scavenged from the gutter 250 through the scavenge port 252 and returned to the reservoir 244. The reservoir 244, thus, is configured to receive oil from the scavenge port 252.

As discussed above, in a concentric arrangement of the gutter 250 and the rotor 220, a distance between the gutter 250 and the rotor 220 is preferably sized based on the greatest amount of oil in the gutter 250 to avoid the oil level from getting close to the rotor (for example, the ring gear). When oil level rises to be close to the rotor, oil could be heavily disturbed and unintentionally picked up by the rotor. If the oil level continues to rise, part of a rim of the rotor could be submerged in the oil, which results in increasing of the drag on the rotor and thus large power loss. This phenomenon is referred to as oil churning. In order to avoid oil churning, one might consider increasing the distance between rotor and gutter, which increases the size of the gutter 250 and the overall size of the gearbox 200 but leaves excess distance between the rotor 220 and the gutter 250 at positions of the gutter where the amount of oil is less. Instead of positioning the gutter concentrically with the epicyclical gear train 202, the gutter 250 may be located eccentrically with the epicyclical gear train 202.

Figure 4:
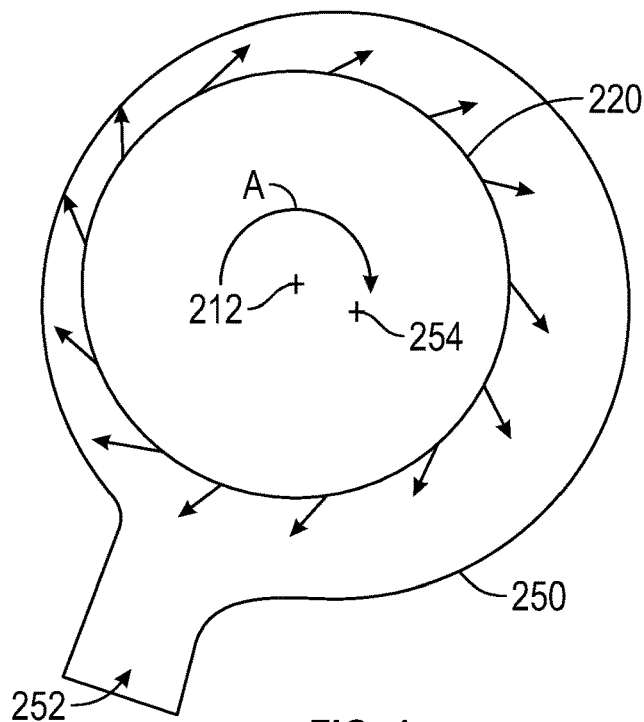
FIG. 4 is a schematic illustration of an arrangement of a rotor and an oil gutter of the gearbox shown in FIG. 3.
Figure 5:
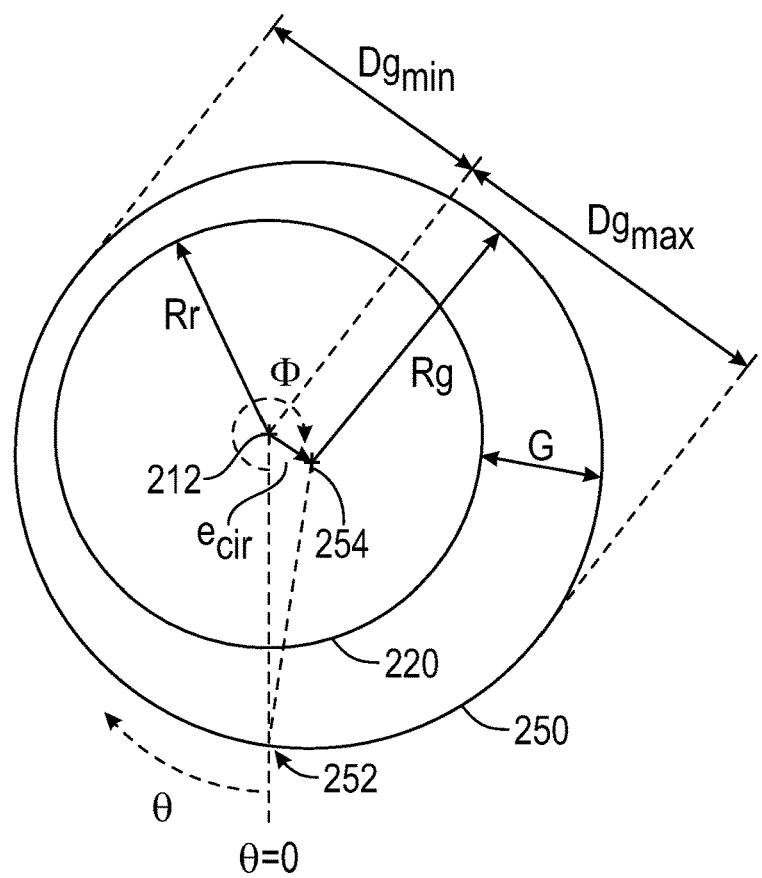
FIG. 5 is another schematic illustration of an arrangement of the rotor and the oil gutter illustrated in FIG. 4.

FIGS. 4 and 5 are schematic diagrams used to illustrate the eccentric gutter 250 of this embodiment. The rotor 220 rotates in direction A about a rotation axis, which, in this embodiment, is the rotational axis 212 of the sun gear 210. As noted above, the rotor 220 expels oil outwardly towards the gutter 250, as illustrated by the arrows from the rotor 220 in FIG. 4. As discussed above, the gutter 250 collects the expelled oil and the collected oil is removed by the scavenge port 252. As noted above, the gutter 250 is circular having a center (gutter center 254) and a radius (gutter radius Rg). In some embodiments, the gutter 250 may have variable radius in an axial direction of the gearbox 200, and in these embodiments, the gutter radius Rg may be the minimum radius of the gutter 250 within the span of the width of the rotor 220. The rotor 220 also has a radius (rotor radius Rr). In some embodiments, the rotor 220 may have variable radius across the width of the rotor 220. In these embodiments, the rotor radius Rr may be the maximum radius of the rotor 220 within the span of the width of the rotor 220, but the gutter radius Rg and the rotor radius Rr should be in the same cross-sectional plane within the span of the width of the rotor 220. In the embodiment where the rotor 220 is the plurality of planet gears 222 collectively rotate together, the rotor radius Rr may be the maximum distance from the center of rotation to the edge of the rotating components. Note that the gutter radius Rg is larger than the rotor radius Rr.

In the following discussion, the radial direction is a radial direction of the rotor taken from the rotational axis 212. Likewise, an angular position θ is taken relative to a reference location in the direction of rotation. The reference location may be the center of the scavenge port 252. When the scavenge port 252 is not circular, the center of the scavenge port 252 may be the center of the width of the port and at inner surface of the gutter 250. The reference location has an angular position θ of zero. The angular position θ increases from zero in the direction of rotation A with a first quadrant being from zero to ninety degrees, a second quadrant being from ninety degrees to one hundred eighty degrees, a third quadrant being from one hundred eighty degrees to two hundred seventy degrees, and a fourth quadrant being from two hundred seventy degrees to three hundred sixty degrees.

The gutter 250 is positioned eccentrically with respect to the rotor 220. In this embodiment, the gutter 250 is positioned such that the rotor 220 is positioned farthest from the gutter 250 at angular positions θ having the most amount of oil, but closer to the gutter 250 at angular positions θ having less oil. The gutter center 254 may be offset in the radial direction of the rotor 220. Where the gutter 250 is circular, the distance that the gutter center 254 is offset in the radial direction from the rotational axis 212 is the eccentricity distance (circular) $e_{cir}$ shown in FIG. 5. In the arrangements discussed above, the gutter center 254 is preferably offset such that the gutter center 254 is in the fourth quadrant. The relative position of the gutter center 254 in terms of the angular position θ may be given by an eccentricity angle φ. The eccentricity angle φ may preferably be between two hundred seventy degrees and three hundred sixty degrees, and, more preferably, between three hundred ten degrees and three hundred fifty degrees.

The position of the gutter 250 and, more specifically, the gutter center 254 may be characterized by an eccentricity ratio ε given by equation (1).

$$\varepsilon = \frac{e_{cir}}{C_{cir}} \qquad (1)$$

In equation (1), eccentricity distance (circular) $e_{cir}$ is the eccentricity distance (circular) discussed above, and centered clearance (circular) $C_{cir}$ is the difference between the gutter radius Rg and the rotor radius Rr ($C_{cir}$=Rg−Rr). Put another way, the eccentricity ratio ε is the ratio of the eccentricity distance e to the difference between the gutter radius Rg and the rotor radius Rr. Based on experimental testing, the eccentricity ratio ε is preferably from two thousandths to seventy-six hundredths and, more preferably, from four thousandths to thirty-eight hundredths.

Figure 6:
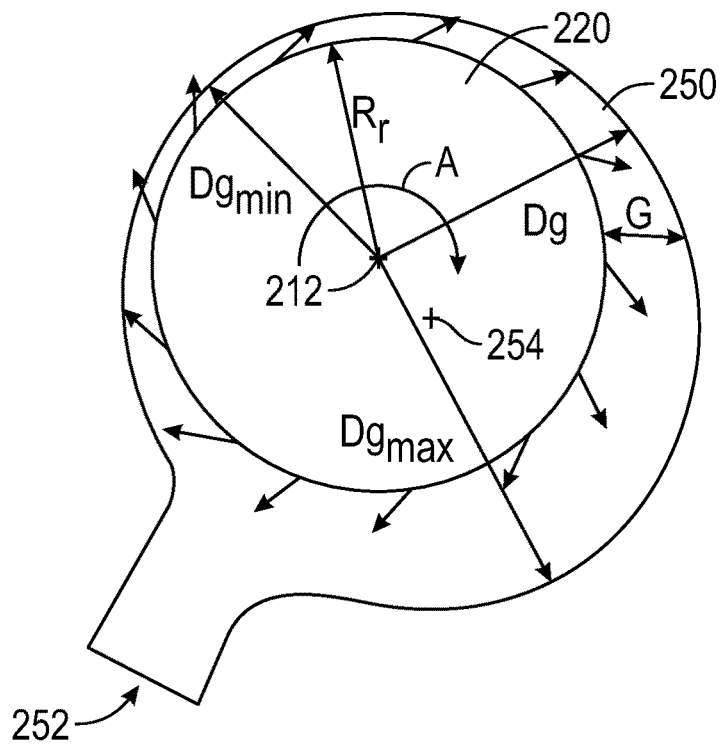
FIG. 6 is a schematic illustration of an arrangement of the rotor and another oil gutter of the gearbox shown in FIG. 3.

FIG. 6 is a schematic diagram used to illustrate another gutter 250 arrangement. In the embodiment shown in FIGS. 4 and 5, the gutter 250 is circular, but the gutter may have other shapes. The gutter 250 may have an elliptical shape as shown in FIG. 6. In the gutter shown in FIG. 6, the gutter center 254 is the center of the ellipse. The gutter 250, and more specifically, the gutter center 254 may be offset in a manner similar to the gutter 250 discussed above with respect to FIGS. 4 and 5.

Figure 7:
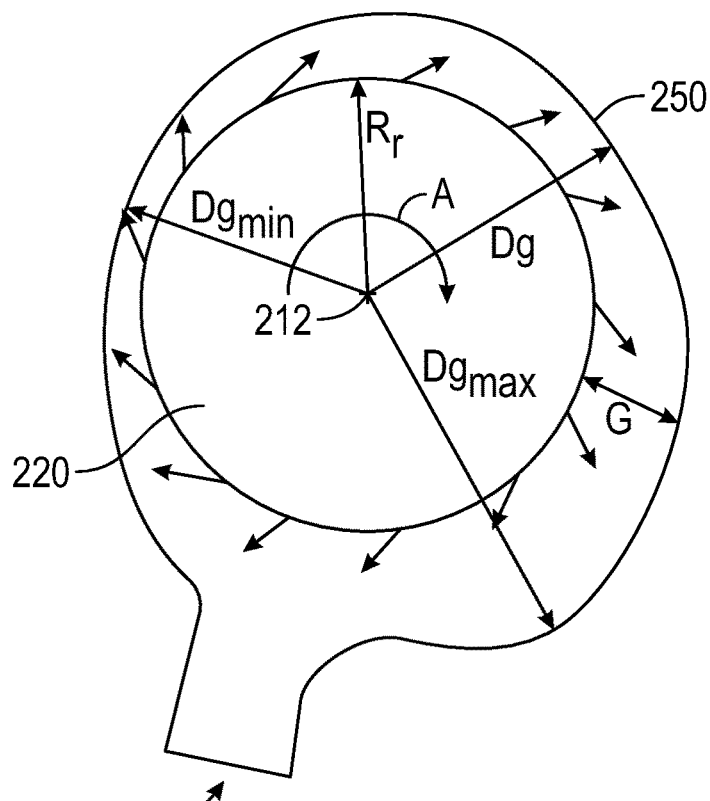
FIG. 7 is a schematic illustration of an arrangement of the rotor and a further oil gutter of the gearbox shown in FIG. 3.

FIG. 7 is a schematic diagram used to illustrate a further gutter 250 arrangement. In this embodiment, the gutter 250 has an irregular shape with the distance G between the rotor 220 and the gutter 250 (a gap G) variable (not constant) over the three hundred sixty degrees (angular positions θ) around the center of the rotor 220 (rotational axis 212). The distance from the center of the rotor 220 (rotational axis 212) to the gutter 250 may also be variable (not constant) over the three hundred sixty degrees (angular positions θ) around the center of the rotor 220 (rotational axis 212). In some embodiments, gutter distance Dg is the distance from the center of the rotor 220 (rotational axis 212) to the gutter 250 at a given angular position θ, and the gap G may be calculated as the difference between the gutter distance Dg and the rotor radius Rr (G=Dg−Rr). In some embodiments, the gap G increases with increasing angular position θ. The gutter distance Dg may have a maximum gutter distance $Dg_{max}$ and a minimum gutter distance $Dg_{min}$.

The irregular shaped gutter 250 or the elliptical shaped gutter 250 may also have an eccentricity ratio ε given by equation (2).

$$\varepsilon = \frac{e_{irr}}{C_{irr}} \qquad (2)$$

In equation (2), the eccentricity distance (irregular) $e_{irr}$ is given by equation (3) and the centered clearance (irregular) $C_{irr}$ is given by equation (4).

$$e_{irr} = \frac{(Dg_{max} - Dg_{min})}{2} \qquad (3)$$

$$C_{irr} = \frac{(Dg_{max} + Dg_{min})}{2} - Rr \qquad (4)$$

Based on experimental testing, the eccentricity ratio ε for the non-circular embodiments also is preferably from two thousandths to seventy-six hundredths and, more preferably, from four thousandths to thirty-eight hundredths.

Figure 8:
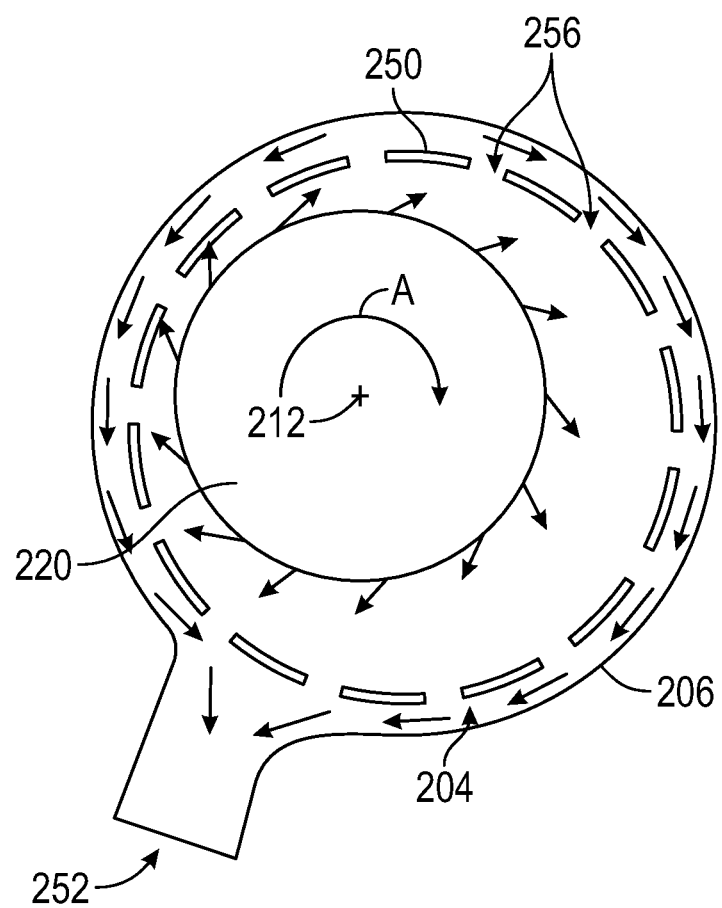
FIG. 8 is a schematic illustration of an arrangement of the rotor, another oil gutter, and an outer casing of the gearbox shown in FIG. 3.

FIG. 8 is a schematic diagram illustrating another gearbox 200 arrangement. In the embodiments discussed above, the scavenge port 252 is located in the gutter 250, but the embodiments discussed herein may be applicable to other gearbox 200 arrangements. An alternative gearbox 200 arrangement is shown in FIG. 8. In this embodiment the gutter 250 includes a plurality of gutter openings 256 around the circumference of the gutter 250. Each gutter opening 256 allows oil to flow out of the gutter 250 into a cavity 204 formed between the gutter 250 and an outer casing 206 of the gearbox 200. In this embodiment, the scavenge port 252 is located in the outer casing 206 and, more specifically on a bottom portion of the outer casing 206 so that gravity may assist in the flow of oil to the scavenge port 252.

Further aspects of the present disclosure are provided by the subject matter of the following clauses.

A gearbox including an oil system, a rotor, and a gutter. The oil system is configured to supply oil to the gearbox. The rotor is rotatable about a rotational axis in a rotational direction. The rotor has a radial direction and expels oil radially outward when the rotor rotates. The gutter is positioned radially outward of the rotor in the radial direction of the rotor to collect oil expelled by the rotor when the rotor rotates. A radial distance from the rotational axis of the rotor to the gutter is variable in the rotational direction.

The gearbox of the preceding clause, wherein the gutter includes a scavenge port. The oil system includes (i) a reservoir fluidly connected to the scavenge port and configured to receive oil from the scavenge port and (ii) at least one oil nozzle fluidly connected to the reservoir and configured to supply oil to the gearbox.

The gearbox of any preceding clause, wherein the gutter is positioned eccentrically with respect to the rotor.

The gearbox of any preceding clause, wherein the gutter has (i) a maximum distance from the rotational axis to the gutter ($Dg_{max}$), (ii) a minimum distance from the rotational axis to the gutter ($Dg_{min}$), and (iii) an eccentricity ratio (ε) from two thousandths to seventy-six hundredths. The eccentricity ratio (ε) is the ratio of an eccentricity distance (e) to a centered clearance (C). The eccentricity distance (e) is given by the following formula: $e=(Dg_{max}-Dg_{min})/2$, and centered clearance (C) is given by the following formula: $C=(Dg_{max}+Dg_{min})/2-Rr$.

The gearbox of any preceding clause, wherein the gutter includes a gutter center. The gutter center is offset from the rotational axis of the rotor in the radial direction of the rotor.

The gearbox of any preceding clause, wherein the rotor has a radius (Rr). The gutter has a radius (Rg). The gutter center is offset in the radial direction of the rotor by an eccentricity distance (e) to have an eccentricity ratio (ε) from two thousandths to seventy-six hundredths. The eccentricity ratio (ε) is the ratio of an eccentricity distance (e) to the difference between the gutter radius and the rotor radius (Rg−Rr).

The gearbox of any preceding clause, wherein the gutter includes a scavenge port. The gutter center is offset from the rotation axis of the rotor by an eccentricity angle that is between two hundred seventy degrees and three hundred sixty degrees. The eccentricity angle is an angular position in the rotation direction of the rotor from a reference location. The reference location is the center of a scavenge port.

The gearbox of any preceding clause, further including an epicyclical gear train. The epicyclical gear train includes a sun gear, a plurality of planet gears, and a ring gear. The sun gear is configured to receive a torque and rotate about an axis of rotation. Each planet gear of the plurality of planet gears engages with the sun gear to be rotated by the sun gear. The ring gear engages with each planet gear of the plurality of planet gears.

The gearbox of any preceding clause, wherein the gutter is located radially outward of the ring gear in the rotational direction of the rotor.

The gearbox of any preceding clause, wherein the gutter is integrally formed with the ring gear.

The gearbox of any preceding clause, wherein the ring gear engages with each planet gear of the plurality of planet gears to rotate about the rotational axis of the sun gear. The ring gear is the rotor and the rotational axis of the rotor is the rotational axis of the sun gear.

The gearbox of any preceding clause, wherein the plurality of planet gears are collectively rotatable about the rotational axis of the sun gear. The plurality of planet gears is the rotor, and the rotational axis of the rotor is the rotational axis of the sun gear.

The gearbox of any preceding clause, further including a carrier. The planet gears are rotatably connected to the carrier. The carrier rotates about the rotation axis of the sun gear as the plurality of planet gears collectively rotate.

The gearbox of any preceding clause, wherein each planet gear meshes with the sun gear at a nip formed between the sun gear and a corresponding planet gear. The oil system includes at least one oil nozzle configured to inject oil into one of the nips formed between the sun gear and the corresponding planet gear.

The gearbox of any preceding clause, wherein the at least one oil nozzle is located upstream of the nip and injects oil in a direction toward the nip.

The gearbox of any preceding clause, wherein each planet gear meshes with the ring gear at a nip formed between the ring gear and a corresponding planet gear. The oil system includes at least one oil nozzle configured to inject oil into one of the nips formed between the ring gear and the corresponding planet gear.

The gearbox of any preceding clause, wherein the at least one oil nozzle is located upstream of the nip and injects oil in a direction toward the nip.

A gas turbine engine including a core, an output element, and the gearbox of any preceding clause. The core includes a compression section, a combustion section, and a turbine section. The gearbox is coupled to the core to transmit torque and power from the core to the output element.

The gas turbine engine of the preceding clause, further including a fan. The fan includes a fan rotor and a plurality of fan blades extending radially outward from the fan rotor. The fan rotor is the output element.

The gas turbine engine of any preceding clause, further including a propeller assembly. The propeller assembly includes a propeller shaft and a plurality of propeller blades extending outwardly from the propeller shaft. The propeller shaft is the output element.

A gearbox for a gas turbine engine. The gearbox includes a rotor, an outer casing, and a gutter. The rotor is rotatable about a rotational axis in a rotational direction. The rotor has a radial direction and expels oil radially outward when the rotor rotates. The outer casing is positioned radially outward of the rotor. The gutter is positioned radially outward of the rotor in the radial direction of the rotor between the outer casing and the rotor. The gutter also is positioned to collect oil expelled by the rotor when the rotor rotates. The gutter includes a plurality of gutter openings around a circumference of the gutter. Each gutter opening of the plurality of gutter openings allows oil to flow out of the gutter and into a cavity formed between the gutter and the outer casing. The rotor is positioned eccentrically with respect to at least one of the outer casing and the gutter.

A method of collecting oil from a rotating part. The method includes supplying oil to a rotor, rotating the rotor about a rotational axis in a rotational direction and expelling oil radially outward, and collecting the oil expelled by the rotor in a gutter. The gutter is positioned radially outward of the rotor in the radial direction of the rotor, and a radial distance from the rotational axis of the rotor to the gutter is variable in the rotational direction.

The method of the preceding clause, wherein the gutter is positioned eccentrically with respect to the rotor.

The method of any preceding clause, wherein the gutter has (i) a maximum distance from the rotational axis to the gutter ($Dg_{max}$), (ii) a minimum distance from the rotational axis to the gutter (Dg min), and (iii) an eccentricity ratio (ε) from two thousandths to seventy-six hundredths, the eccentricity ratio (ε) being the ratio of an eccentricity distance (e) to a centered clearance (C), wherein the eccentricity distance (e) is given by the following formula: $e=(Dg_{max}-Dg_{min})/2$, and centered clearance (C) is given by the following formula: $C=(Dg_{max}+Dg_{min})/2-Rr$.

The method of any preceding clause, wherein the gutter includes a gutter center. The gutter center is offset from the rotational axis of the rotor in the radial direction of the rotor.

The method of any preceding clause, wherein the rotor has a radius (Rr), the gutter has a radius (Rg), and the gutter center is offset in the radial direction of the rotor by an eccentricity distance (e) to have an eccentricity ratio (ε) from two thousandths to seventy-six hundredths, the eccentricity ratio (ε) being the ratio of an eccentricity distance (e) to the difference between the gutter radius and the rotor radius (Rg−Rr).

The method of any preceding clause, wherein the gutter includes a scavenge port. The gutter center is offset from the rotation axis of the rotor by an eccentricity angle that is between two hundred seventy degrees and three hundred sixty degrees. The eccentricity angle is an angular position in the rotation direction of the rotor from a reference location. The reference location being a center of a scavenge port.

The method of any preceding clause, wherein the rotor is part of an epicyclical gear train. The method further includes rotating a sun gear about a rotational axis to rotate the rotor.

The method of any preceding clause, wherein the rotor is a ring gear connected to the sun gear by a plurality of planet gears. Each planet gear of the plurality of planet gears engages with the sun gear to be rotated by the sun gear, and the ring gear engages with each planet gear of the plurality of planet gears to rotate about the rotational axis of the sun gear.

The method of any preceding clause, wherein the rotor is a plurality of planet gears collectively rotating about the rotational axis of the sun gear. Each planet gear of the plurality of planet gears engages with the sun gear to be rotated by the sun gear and engages with a ring gear.

The method of any preceding clause, wherein the gutter is integrally formed with the ring gear.

The method of any preceding clause, wherein each planet gear meshes with the sun gear at a nip formed between the sun gear and a corresponding planet gear. The method further includes injecting oil into at least one of the nips formed between the sun gear and the corresponding planet gear.

The method of any preceding clause, wherein each planet gear meshes with the ring gear at a nip formed between the ring gear and a corresponding planet gear. The method further includes injecting oil into at least one of the nips formed between the ring gear and the corresponding planet gear.

The method of any preceding clause, wherein the oil is injected upstream of the nip.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A gearbox for a gas turbine engine, the gearbox comprising:
   a rotor rotatable about a rotational axis in a rotational direction, the rotor having a radial direction and expelling oil radially outward when the rotor rotates; and
   a gutter positioned radially outward of the rotor in the radial direction of the rotor to collect oil expelled by the rotor when the rotor rotates, a radial distance from the rotational axis of the rotor to the gutter being variable in the rotational direction,
   wherein the gutter includes a gutter center, the gutter center being offset from the rotational axis of the rotor in the radial direction of the rotor,
   wherein the rotor has a radius (Rr),
   wherein the gutter has a radius (Rg), and
   wherein the gutter center is offset in the radial direction of the rotor by an eccentricity distance (e) to have an eccentricity ratio ($\varepsilon$) from two thousandths to seventy-six hundredths, the eccentricity ratio ($\varepsilon$) being the ratio of an eccentricity distance (e) to the difference between the gutter radius and the rotor radius (Rg−Rr).

2. The gearbox of claim 1, wherein the gutter includes a scavenge port, and
   wherein the gearbox further comprises an oil system configured to supply oil to the gearbox, the oil system including (i) a reservoir fluidly connected to the scavenge port and configured to receive oil from the scavenge port and (ii) at least one oil nozzle fluidly connected to the reservoir and configured to supply oil to the gearbox.

3. The gearbox of claim 1, wherein the gutter includes a scavenge port having a center, and
   wherein the gutter center is offset from the rotation axis of the rotor by an eccentricity angle that is between two hundred seventy degrees and three hundred sixty degrees, the eccentricity angle being an angular position in the rotational direction of the rotor from an angular position of a reference location to a reference line formed between the rotation axis of the rotor and the gutter center, the reference location being the center of the scavenge port.

4. The gearbox of claim 1, further comprising an epicyclical gear train including:
   a sun gear configured to receive a torque and rotate about a rotational axis;
   a plurality of planet gears, each planet gear of the plurality of planet gears engaging with the sun gear to be rotated by the sun gear; and
   a ring gear engaging with each planet gear of the plurality of planet gears.

5. The gearbox of claim 4, wherein the gutter is located radially outward of the ring gear in the rotational direction of the rotor.

6. The gearbox of claim 4, wherein the gutter is integrally formed with the ring gear.

7. The gearbox of claim 4, wherein the ring gear engages with each planet gear of the plurality of planet gears to rotate about the rotational axis of the sun gear, the ring gear being the rotor and the rotational axis of the rotor being the rotational axis of the sun gear.

8. The gearbox of claim 4, wherein the plurality of planet gears are collectively rotatable about the rotational axis of the sun gear, the plurality of planet gears being the rotor, and the rotational axis of the rotor being the rotational axis of the sun gear.

9. The gearbox of claim 8, further comprising a carrier, the planet gears being rotatably connected to the carrier, and the carrier rotating about the rotation axis of the sun gear as the plurality of planet gears collectively rotate.

10. The gearbox of claim 4, wherein each planet gear meshes with the sun gear at a nip formed between the sun gear and a corresponding planet gear, and the gearbox further comprises an oil system including at least one oil nozzle configured to inject oil into one of the nips formed between the sun gear and the corresponding planet gear.

11. The gearbox of claim 10, wherein the at least one oil nozzle is located upstream of the nip and injects oil in a direction toward the nip.

12. The gearbox of claim 4, wherein each planet gear meshes with the ring gear at a nip formed between the ring gear and a corresponding planet gear, and the gearbox further comprises an oil system including at least one oil nozzle configured to inject oil into one of the nips formed between the ring gear and the corresponding planet gear.

13. The gearbox of claim 12, wherein the at least one oil nozzle is located upstream of the nip and injects oil in a direction toward the nip.

14. A gas turbine engine comprising:
   a core including a compression section, a combustion section, and a turbine section;
   a fan including a fan rotor and a plurality of fan blades extending radially outward from the fan rotor; and the gearbox of claim 1, wherein the gearbox is coupled to the core to transmit torque and power from the core to the fan rotor.

15. A gas turbine engine comprising:
- a core including a compression section, a combustion section, and a turbine section;
- a propeller assembly including a propeller shaft and a plurality of propeller blades extending outwardly from the propeller shaft; and
- the gearbox of claim 1, wherein the gearbox is coupled to the core to transmit torque and power from the core to the propeller shaft.

16. A gearbox for a gas turbine engine, the gearbox comprising:
- a rotor rotatable about a rotational axis in a rotational direction, the rotor having a radial direction and expelling oil radially outward when the rotor rotates;
- an outer casing positioned radially outward of the rotor; and
- a gutter positioned radially outward of the rotor in the radial direction of the rotor between the outer casing and the rotor, the gutter positioned to collect oil expelled by the rotor when the rotor rotates and including a plurality of gutter openings around a circumference of the gutter, each gutter opening of the plurality of gutter openings allowing oil to flow out of the gutter and into a cavity formed between the gutter and the outer casing,
- wherein the rotor is positioned eccentrically with respect to at least one of the outer casing and the gutter and the at least one of the outer casing and the gutter has an eccentric surface,
- wherein the rotor has a radius (Rr),
- wherein the eccentric surface has (i) a maximum distance from the rotational axis to the eccentric surface ($Ds_{max}$), (ii) a minimum distance from the rotational axis to the eccentric surface ($Ds_{min}$), and (iii) an eccentricity ratio ($\varepsilon$) from two thousandths to seventy-six hundredths, the eccentricity ratio ($\varepsilon$) being the ratio of an eccentricity distance (e) to a centered clearance (C), and
- wherein the eccentricity distance (e) is given by the following formula: $e=(Dg_{max}-Dg_{min})/2$, and centered clearance (C) is given by the following formula: $C=(Dg_{max}+Dg_{min})/2-Rr$.

17. A gearbox for a gas turbine engine, the gearbox comprising:
- a rotor rotatable about a rotational axis in a rotational direction, the rotor having a radial direction and expelling oil radially outward when the rotor rotates; and
- a gutter positioned radially outward of the rotor in the radial direction of the rotor to collect oil expelled by the rotor when the rotor rotates, a radial distance from the rotational axis of the rotor to the gutter being variable in the rotational direction,
- wherein the rotor has a radius (Rr),
- wherein the gutter has (i) a maximum distance from the rotational axis to the gutter ($Dg_{max}$), (ii) a minimum distance from the rotational axis to the gutter ($Dg_{min}$), and (iii) an eccentricity ratio ($\varepsilon$) from two thousandths to seventy-six hundredths, the eccentricity ratio ($\varepsilon$) being the ratio of an eccentricity distance (e) to a centered clearance (C), and
- wherein the eccentricity distance (e) is given by the following formula: $e=(Dg_{max}-Dg_{min})/2$, and centered clearance (C) is given by the following formula: $C=(Dg_{max}+Dg_{min})/2-Rr$.

18. The gearbox of claim 17, wherein the gutter includes a scavenge port, and
- wherein the gearbox further comprises an oil system configured to supply oil to the gearbox, the oil system including (i) a reservoir fluidly connected to the scavenge port and configured to receive oil from the scavenge port and (ii) at least one oil nozzle fluidly connected to the reservoir and configured to supply oil to the gearbox.

19. The gearbox of claim 17, wherein the gutter is positioned eccentrically with respect to the rotor.

20. The gearbox of claim 17, wherein the gutter includes a gutter center, the gutter center being offset from the rotational axis of the rotor in the radial direction of the rotor.

* * * * *